Nov. 27, 1934.  W. M. BAILEY.  1,982,411
SHIELDED RESILIENT SEPARATOR
Filed June 18, 1930
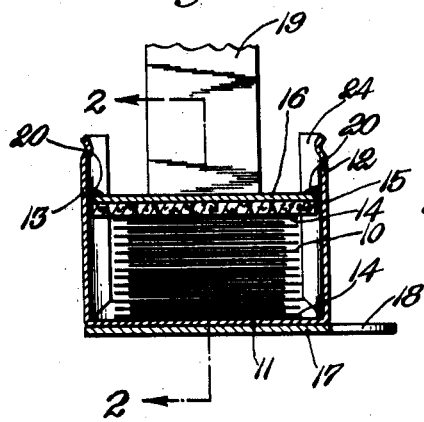
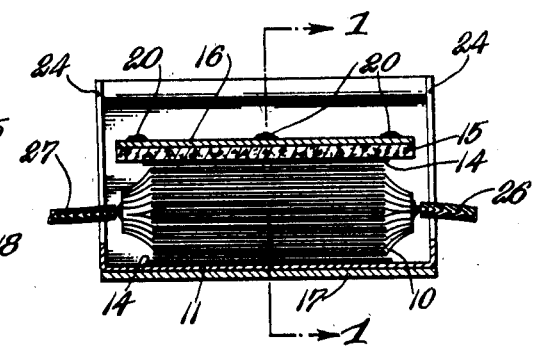
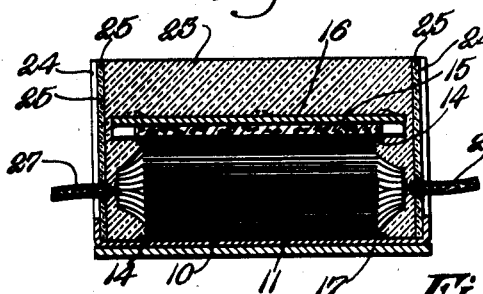
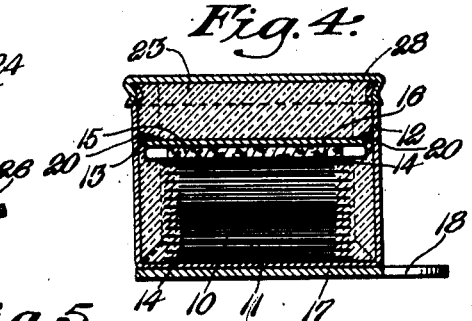
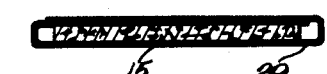
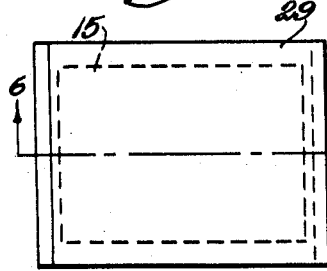
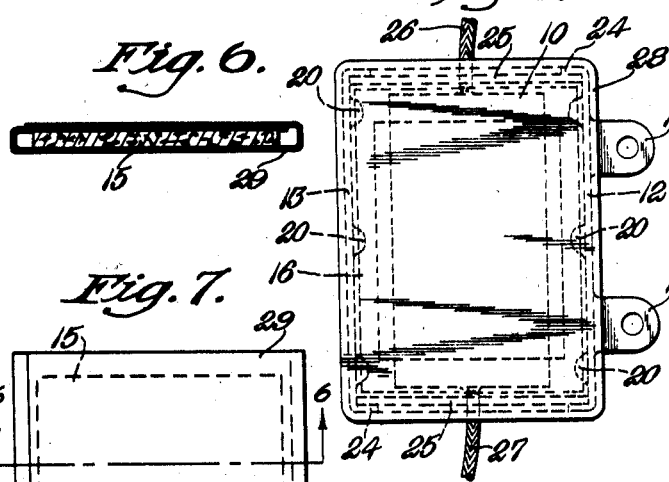
Inventor:
William M. Bailey
By his Attorney Patented Nov. 27, 1934

1,982,411

UNITED STATES PATENT OFFICE 1,982,411

SHIELDED RESILIENT SEPARATOR

William M. Bailey, Lynn, Mass., assignor, by mesne assignments, to General Electric Company, a corporation of New York Application June 18, 1930, Serial No. 461,918

12 Claims. (Cl. 175—41)

This invention relates to capacitors and has for its object to provide a light weight device suitable for short waves, having small eddy current and dielectric losses.

Another object is to provide such a device which is simple, inexpensive, of few parts and easily assembled and clamped within a casing.

Referring to the drawing Fig. 1 is an end view showing the capacitor during the process of its construction and is a section on the line 1—1 of Fig. 2;

Fig. 2 is a section on line 2—2 of Fig. 1;

Fig. 3 is a longitudinal section thru a finished construction embodying this invention;

Fig. 4 is an end view corresponding to Fig. 3 except that in addition the cover is in place;

Fig. 5 is a top plan view of the device of Fig. 4;

Fig. 6 is a section on line 6—6 of Fig. 7;

Fig. 7 is a top plan view of one of the shielded cork separator layers of this invention.

Referring to Fig. 1 the capacitor 10 may be of any appropriate type which is desired to be clamped under pressure such as a mica stack or a roll paper capacitor. The bottom of the capacitor rests against an abutment 11 in this case formed of sheet metal having portions thereof bent up to form the sides 12 and 13 of a U-shaped member, said sides serving as guides for the opposite capacitor end plate 16. At each end of the stack or other form of capacitor is a thin micanite sheet 14. Contiguous to the upper sheet 14 is the cork spring separator member 15 and over this is placed the stiff metal pressure plate 16. Member 15 is located between 16 and 14. Plate 16 as a clamping plate lies against the face of flat spring (as cork) 15, and, Fig. 1, between the sides 12 and 13 of the U-shaped member of which the bottom 11 is engaged by the bottom of the capacitor 10. U-shaped member 11, 12, 13, Fig. 1, constitutes a portion of the container or casing for the capacitor 10, i. e., a bottom 11 and two sides 12, 13. Two other casing-sides 25, Fig. 3, are insulating sheets held in position inside integral portions or guides 24, Fig. 1, of integral sides or 12, 13 of the U-shaped member. Clamping-plate 16, Fig. 1, lies between sides 12, 13, and is secured to them at 20 to be described. The lower capacitor abutment 11 is secured to or formed integral with a supporting plate 17 having the usual convenient projecting lugs 18 for holding the casing in position.

In assembly, a compression tool 19 presses down on the pressure plate 16 compressing the stack and cork spring member 15 to the desired amount when sufficient particles or small beads of solder 20 are applied to the guides 12 and 13 and to the end plate 16 thus holding the end plate in a position compressing the cork-spring and clamping the capacitor the desired amount and transferring the stack compressive stress to the casing or guides 12 and 13 by way of the cork-spring and pressure plate. Soldering is preferable to welding on account of the lower temperatures involved. The compression and soldering operations generally take place on the work bench and the compression tool 19 may be actuated or controlled by foot pressure or otherwise, and where the foot controls the pressure tool 19 the hands are left free to perform the soldering operation. In the embodiment illustrated it is only necessary to apply three beads 20 of solder to each side edge of the plate, all of which can be done with the casing in a single position and without turning it around.

Inside and between the two flanges 24 on each of the two guides 12 and 13 is held a sheet of mica 25 or other insulating material constituting the ends of the casing so that the casing is adapted to hold an embedment 23 of wax, sulphur or other desired insulating material. It will be noticed that the pressure plate 16 and the cork spring member 15 are each spaced from the guides or casing walls 12 and 13 whereby the plastic embedment may flow between 15 and 16 and casing walls 12—13, 25 to fill the space around the capacitor and above the end plate 16 as illustrated in Figs. 3 and 4. There are ample spaces between the above three solder beads 20 for the embedment 23 to flow down into the space around electrostatic element 10 and the lower portion of its casing 12—13, 25. The terminal leads 26 and 27 from the capacitor are led out thru openings in the insulating side plates 25. After the casing has been filled with embedment 23 a springy sheet metal cover 28 may be slipped into place as shown in Fig. 4 the cover having bent portions, as shown, fitting in and slidable along corresponding bent portions of the sheet metal sides of the casing.

In operation, the desired capacity of the apparatus is preserved by the cork-spring 15. As the electrostatic element 10 tends to expand as the result of heating, the flat cork-spring yields to such tendency and permits such expansion thereby preserving the pressure of the portions of element 10 against the surface areas of one another and thereby in turn preventing the undesirable variation of capacity which would result if the surface-pressure of the portions of element 10 were allowed to be increased by the expansion of element 10 against its fixedly related end pressure members 16 and 11. The flat spring 15 is interposed between the stiff metal pressure plate 16 and the electrostatic element 10 so that spring 15 is placed effectively in series in the clamping system which in the example disclosed includes the sheet metal casing which encloses element 10, all so that the cork spring 15 is as effective, in a mechanical clamping sense, as the steel bent leaf spring which heretofore has been used to permit variations in expansion of element 10 and thereby preserve the desired capacity which is established initially by the fixation of pressure plate 16. But such prior steel bent leaf spring of itself was superior in an electrical sense to the cork spring substituted in the same relative location characteristically because there were comparatively small electrical losses by hysteresis or eddy currents in the metal spring, whereas the cork material is not only a dielectric but a poor dielectric and would be the seat of substantial dielectric losses which impair electrostatic operation if placed in the electrostatic circuit as the prior art metal spring namely in the electrostatic circuit between the metallic casing and the two clamped terminal portions of electrostatic element as 10. But the advantages of a cork spring to preserve the desired initial capacity of element 10 were so great that I conceived that it would be valuable if a way could be found to remove the above disadvantage of the cork as a spring in the prior arrangements of electrostatic element and metal spring. For example, a disadvantage of the prior bent leaf steel spring was that it required an additional bearing plate between itself and the comparatively fragile element 10, thereby increasing the expense and weight, by adding more metal to the weight of the steel or phosphor-bronze spring itself. In the capacitor shown, however, the entire construction is devised for low total weight including the sheet metal and mica sheets 25 constituting the casing, and the provision of the cork spring 15 both in and of itself and also without need of any metal bearing plate between flat cork 15 and element 10, causes a substantial reduction in total weight. Also it is extremely important to good operation of the capacitor that the pressure applied to element 10 shall be as uniformly distributed over the entire active electrostatic areas in the element 10 as if both the flat metallic members 11 and 16 were applied directly to element 10; and the extremely springy cork plate 15 of substantial thickness as shown, for substantial resiliency (when element 10 contracts on cooling the cork follows up such contraction continuing to preserve the desired capacity constant) produces this result since it is in the form of a flat plate just like pressure-plate 16 as distinguished from the prior spring consisting of a bent or curved steel plate which inherently was incapable of lying flat against element 10 and therefore as above, required a separate flat metal bearing plate adjacent element 10 to distribute the pressure uniformly over element 10. The cork spring is flat, its resiliency is inherent in its nature or natural internal structure and not in its shape, and when this perfectly flat but extremely resilient spring is of substantial thickness as shown, it is capable of allowing freely as great expansion of element 10 as the prior bent leaf steel spring, and is desirably of very much less weight, not to mention the further reduction of weight by lack of need of a bearing plate between the spring and element 10 on account of the perfect flatness of the inherently springy cork. And as shown in Figs. 6—7, where a metallic foil 29 is provided as conducting covering for cork spring 15, such foil is so readily yieldable, cooperatively with spring 15, to stresses of expansion of element 10 that it offers substantially no resistance to either the inherent compressibility of the cork spring by expansion of element 10 or the inherent expansibility of the cork spring against element 10 when the latter contracts on cooling, the cork therefore being free to exact its prime function of preserving the desired initial capacity of element 10 as determined initially by the position of pressure-plate 16 to which the latter is moved by compressing tool 19,—it being noted that plate 16 is retained permanently in that capacity-determining position by solder 20. Electrostatic losses in the body of the poor dielectric material of the flat spring 15 are minimized as the result of the position of 15 in the mechanical clamping system which position is in shunt to the electrostatic circuit which includes element 10 and its terminals 26—27 which are in shunt to metallic members 11, 12, 13, solder 20, and pressure plate 16. The object and result of foil 29, Figs. 6—7, (spring 15 when of cork being of insulating material) is to provide an electrically conducting link between metallic conducting pressure-plate 14 and fixed plate 16 which link in effect further makes cork 15 more definitely a portion of the above system in shunt to said electrostatic circuit of capacitor element 10, and therefore frees the cork spring from the action of the electric lines which otherwise would result in the undesirable dielectric losses above referred to. Thus the above electrical disadvantage of the cork spring is obviated. The combination of the cork 15 and foil 29 in effect is as advantageous electrically as the prior bent or curved steel leaf spring in its different arrangement, but mechanically the cork is much superior to the steel spring because even when foil 29 is used as is greatly preferred, the total weight is much less than that of the steel spring plus its additional steel bearing plate, and the cork with or without foil 29 is of much less weight than the steel spring alone and, what is of greater importance, the flat inherently resilient cork spring bears with equal pressure on all portions of element 10 which it over-lies so that the pressure of stiff metal pressure-plate 16 is evenly distributed over the surface of element 10.

The cork spring 15 in the arrangement shown (in shunt to the electrostatic circuit of 10 between 26 and 27) also possesses further advantages over the prior arrangement of metal spring in the electrostatic circuit of a capacitor, in addition to the facts that the cork is lighter, cheaper and takes up less space than a metal spring arrangement with necessary bearing plate. (Even when foil 29 is used as is preferable, it does not add materially to the cost, space or weight of the apparatus). The fact is that bent leaf metallic members, of steel or phosphor-bronze for resiliency, in the prior arrangements, were subject to high eddy current and hysteresis losses, and one of the objects of the invention was to provide a spring arrangement not subject to such losses in the spring when placed as at 15 (irrespective of use of foil 29) in shunt to terminals 26—27 and to the neighboring element 10 in the circuit, where even although 15 be of poor dielectric material, there would be less losses with-in the interior mass of member 15 than if it were a bent leaf steel spring or the like in series with 10 as heretofore. So here, the cork spring 15 although of poor dielectric material and therefore itself subject to hysteresis or eddy current losses, is not exposed to the highest electrical stresses which would cause such losses in a spring of metal in series in the electrostatic circuit.

What I claim is:

1. A capacitor including an electrostatic element and a U-shaped metallic member the bottom central portion of which receives the bottom of the electrostatic element and the sides of which extend along said element; an independent metallic clamping plate lying between the sides of the said U-shaped member, compressing the electrostatic element against said bottom central portion of said U-shaped member, and putting the sides of the latter under tension; a flat, thick spring of highly resilient material interposed between said clamping plate and the electrostatic element; and soldered connections between the said U-shaped member and said clamping plate holding the parts in said clamped relation.

2. A capacitator including an electrostatic element and a metallic U-shaped member the bottom central portion of which receives the bottom of the electrostatic element and the sides of which extend along said element; a yieldable plate of insulating material lying on top of said element between the sides of the U-shaped member; a metal foil shield completely enclosing said insulating plate and reducing dielectric losses; and means holding the insulating plate in a location between the sides of said U-shaped member which subjects the electrostatic element to mechanical pressure against the bottom central portion of the U-shaped member.

3. A capacitor including an electrostatic element and a U-shaped metallic member of strip-like cross-section the bottom central portion of which receives the bottom of the electrostatic element and the sides of which extend along and beyond the top of said element; said sides being formed with flanges; insulating plates held inside said flanges and closing the spaces between said sides forming therewith a casing for the electrostatic element; an independent metallic clamping plate lying on top of the electrostatic element between the sides of said U-shaped member and the insulating plates and below the top free ends of said sides; and spaced beads of solder securing said metallic clamping plate to the sides of said metallic U-shaped plate in a position subjecting the electrostatic element to desired mechanical compression between the clamping plate and the central bottom portion of the U-shaped plate; said clamping plate having its edges separated sufficiently from said sides of said U-shaped member for the flow of an insulating embedment for the electrostatic element between the clamping plate, casing and solder beads.

4. A capacitor including an electrostatic element and a U-shaped metallic member of strip-like cross-section the bottom central portion of which receives the bottom of the electrostatic element and the sides of which extend along and beyond the top of said element; insulating plates closing the spaces between said sides and forming therein a casing for the electrostatic element; a yieldable plate of insulating material lying on top of said element inside said casing; and a rigid clamping member lying on top of said yieldable plate in a position below the tops of the sides of said casing in a position relative to the bottom central portion of the U-shaped member which subjects the electrostatic element to desired mechanical compression; and means securing said yieldable plate and clamping member in such clamping positions; the electrostatic element being spaced from the walls of said casing, and the casing, yieldable plate, clamping member and securing means being combined in an arrangement providing for flow of an insulating embedment from one face to the other of the facing clamping member and yieldable plate.

5. A capacitor which includes an electrostatic element and a metallic clamping system subjecting it to desired pressure determining its capacity, and resilient means preserving such capacity substantially constant during thermal expansion and contraction of the electrostatic element, said resilient means including a flat, thick dielectric plate of highly resilient material interposed between the electrostatic element and the clamping system and metallic foil around said plate electrically connected to the clamping system.

6. A capacitor which includes an electrostatic element and a metallic clamping system subjecting it to desired pressure determining its capacity; a flat cork plate of substantial thickness for substantial resiliency interposed between the electrostatic element and its said clamping system and preserving its capacity substantially constant during its expansion and contraction by temperature changes due to operation; and metallic foil in position preventing dielectric losses in said cork plate by reason of its said interposed location.

7. A capacitor which includes an electrostatic element and a metallic clamping system including a U-shaped metallic casing member subjecting the electrostatic element to desired pressure determining its capacity, said clamping system including a pressure plate; terminals extending from the electrostatic element in opposite directions and between the sides of the U-shaped member and between said pressure-plate and the bottom of the U-shaped member; and a flat thick spring of highly resilient material interposed between said pressure plate and the electrostatic element and preserving substantially constant said desired capacity during operation by yielding to temperature expansion of the electrostatic element and following up contraction of the same on cooling.

8. A capacitor which includes an electrostatic element, a metallic clamping system therefor including a sheet metal strip having its ends bent along said element in position on the intermediate portion of said strip; a stiff flat metal pressure plate extending over said electrostatic element toward said bent strip portions, the ends of said bent portions extending beyond said pressure-plate; a flat cork plate of substantial thickness for substantial resiliency, interposed between said pressure plate and the electrostatic element; the electrostatic element being spaced from said bent strip-portions and said pressure plate and cork plate having portions spaced from said bent strip-portions providing communication between the spaces between said bent portions and on opposite faces of said plates and around the electrostatic element; and means securing said strip-ends to the adjacent portions of said pressure-plate in a position of the latter compressing the electrostatic element and cork plate to an extent determining the desired capacity, said cork plate thereafter preserving said capacity substantially constant by maintaining substantially the same compression on the electrostatic element for all expansions and contractions of the latter in service.

9. A light-weight capacitor of substantially constant capacity under various temperature-expansions of the electrostatic element, which includes a sheet-metal casing member for said element against the bottom of which said element bears, with its terminal-ends facing the sides of said casing-member; terminal leads extending from the ends of the electrostatic element out thru said casing-sides; a pressure-plate extending over said electrostatic element toward said casing sides but spaced therefrom; solder-beads securing together said spaced pressure-plate and casing-sides at spaced-apart points; and a flat cork plate of substantial thickness for substantial resiliency interposed between said pressure-plate and the electrostatic element.

10. A capacitor including in combination with an electrostatic element, a casing therefor, a metallic pressure-plate compressing the electrostatic element against a wall of the casing, terminals extending from opposite portions of the electrostatic element thru opposite walls of the casing which are adjacent the casing-wall against which the electrostatic element is compressed by said pressure-plate; and a flat spring-plate of highly resilient material and substantial thickness constituting a portion of the clamping system which includes said casing and pressure-plate; the electrostatic element and its said terminals lying between said pressure-plate and the wall of the casing against which the electrostatic element is compressed by said pressure-plate.

11. A capacitor including an electrostatic element and a U-shaped metallic member, the bottom central portion of which receives the bottom of the electrostatic element and the sides of which extend along said element; a flat, thick spring of highly resilient material lying between the sides of the U-shaped member and compressing the electrostatic element against the bottom of the U-shaped member; a clamping plate on said flat spring and also between the sides of the U-shaped member; two terminals extending through the opposite open sides of the U-shaped member to opposite portions of the electrostatic element and between said spring and the bottom of the U-shaped member; means holding the clamping plate and flat spring in position clamping the electrostatic element against said bottom central portion of the U-shaped member; and insulating plates closing the open sides of the U-shaped member and insulating said terminals.

12. A capacitor which includes an electrostatic element, a box like casing including opposite metallic sides and a metallic bottom against the bottom of the interior of which said electrostatic element bears for clamping thereby, with its two terminal ends facing the side of said casing between said metallic sides thereof; terminal leads extending from said ends of the electrostatic element out through said casing sides; a pressure plate extending over said electrostatic element as the opposing clamping element thereof, said plate extending toward said metallic casing-sides and secured thereto in a location subjecting the electrostatic element to the compression desired for a given capacity; and a flat thick spring plate of highly resilient material interposed between said pressure plate and the electrostatic element, the latter being held between said thick spring plate and casing bottom at the pressure and capacity determined by the location of the pressure plate at all states of expansion of the electrostatic element in service, said pressure plate secured to the metallic casing-sides having portions spaced from said sides and said spring plate also having portions spaced from said metallic casing-sides.

WILLIAM M. BAILEY.